United States Patent Office 2,750,251
Patented June 12, 1956

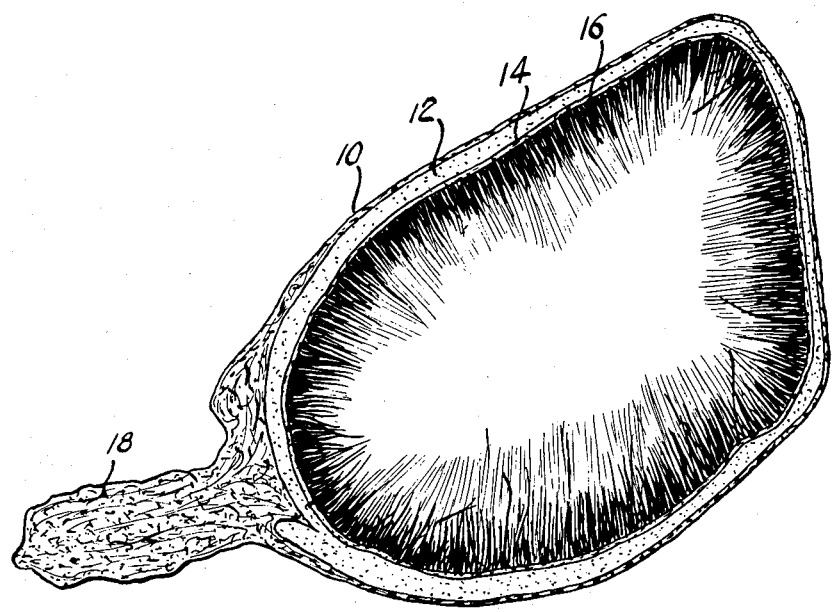

2,750,251

PROCESS FOR PREPARING SUTURES AND LIGATURES

Alfred Bloch, Highland Park, N. J., and John F. Gettemans, Midlothian, Ill., assignors to Ethicon, Inc., a corporation of New Jersey Application July 9, 1954, Serial No. 442,242

11 Claims. (Cl. 8—94.11)

This invention relates to collagenous articles and method for their preparation, with particular emphasis on a method for the preparation of substantially pure collagen from connective tissue, hides and skins, and more particularly relates to a method for preparing collagen strands for surgical uses, such as suturing and ligating, from the connective tissue layers of mammalian gut.

Practically the entire production of collagenous sutures and ligatures is currently made from sheep gut. Some collagenous strands for use as tennis strings are made from beef gut. Mammalian gut, as illustrated in the drawing, which is an enlarged cross-sectional view of a sheep small intestine, is composed of two connective tissue layers, an outer serosal layer 10 and an inner submucosal layer 14, consisting essentially of collagen, with a muscularis layer 12 between the connective tissue layers. The muscularis layer consists principally of muscle tissue permeated with blood vessels and nervous tissue and its components consist largely of proteins, both fibrous and cellular, lipids, polysaccharides, and other complex substances. The inner layer of connective tissue is lined with a mucosal layer 16 which is readily removed by mechanical scraping and squeezing operations. A gut from which the mucosa has been removed is commonly spoken of as a casing.

The mesentery 18, which serves to carry lymphatics, blood vessels, and nerves to the intestinal organ, is attached to the outer surface of the gut and amounts to a physical continuation of the serous layer. The outer surface of the gut is generally lined with considerable amounts of fat and particularly heavy deposits of fat are usually present at the place of attachment of the mesentery to the gut.

Heretofore, it has been the practice in making collagenous sutures and ligatures from sheep gut, to remove the mesentery, mucosal layer, serous layer of connective tissue, and muscularis by mechanical means such as scraping or squeezing or both. Mechanical scraping and squeezing of gut provide a submucosal layer composed primarily of collagen but associated with some mucoids, noncollagenous proteinaceous materials, fats, and lipoids. In order to remove a maximum amount of noncollagenous materials from the mechanically scraped and squeezed gut, the material, in conventional processes, is treated with a mildly alkaline solution such as soda ash, or ammonium hydroxide for several hours followed by mechanical scraping or squeezing. This step is repeated in a minimum of five and a maximum of eleven, but usually eight times, before the material is in a satisfactory condition for use in the preparation of sutures and ligatures. In order that sutures and ligatures having satisfactory strength and acceptable appearance may be prepared from strips of connective tissue, it is essential that substantially pure collagen be used because contaminants, such as fat, muscle, mucosal, and serous tissues, give the finished strands a speckled appearance and seriously lessen their tensile strength. The sheep casing may be split into two strips before the steeping and scraping operations or after these steps. Several strips, the number depending on the diameter desired, are combined and twisted to form a strand. It is essential that there be good bonding between the strips in order that a strand be obtained which will not fray and will have high strength and good appearance. Better bonding is obtained if the collagen of the strips is not contaminated with noncollagenous proteins and fatty materials. Fatty materials are particularly prone to cause weak bonding and strands with weak bonding tend to fray. Mucoids and muscle tissue also reduce the strength of the strand. The presence of muscle tissue in the strand has the further disadvantage that it may set up an antigenic reaction in human tissue. Because of the fragile nature of connective tissue obtained from mammalian gut, repeated squeezing and scraping operations following each steeping period destroy or damage a large number of strips or tubes of connective tissue by mechanical damage and renders them worthless for use in preparing strands for suturing and ligating uses. Repeated steeping and scraping operations are also time consuming and add materially to the cost of the preparation of sutures and ligatures. The conventional practice of repeated steeping and mechanical scraping and squeezing operations does not remove all undesirable noncollagenous substances, such as fats, lipid complexes, and noncallagenous proteins, from the connective tissue. Sutures and ligatures prepared from such material may display antigenicity and have lower tensile strength and poorer appearance than sutures and ligatures prepared from collagen strips of a higher degree of freedom from such noncollagenous materials.

It is the principal object of this invention to provide a method for the preparation of connective tissue, in the form of intestinal membranes, hides and skins, consisting of substantially pure collagen.

It is another object of this invention to provide a method for the substantially complete removal of mucoids, noncollagenous proteins and fats from connective tissue layers of mammalian gut.

It is still another object of this invention to provide a method for the preparation of strands of connective tissue consisting of substantially pure collagen.

The objects of this invention are accomplished by a process in which connective tissue layers of mammalian gut are mechanically treated to remove a major amount of the muscularis, fat, and other noncollagenous materials, steeped in an aqueous solution of a sodium salt of ethylenediamine polyacetic acid, and made into strands suitable for suturing and ligating use.

After treatment of mammalian gut by mechanical means, such as scraping and squeezing operations to remove a major amount of noncollagenous substances; the connective tissue layers in the form of strips or tubes and consisting essentially of collagen, but contaminated by minor amounts of noncollagenous proteins and fatty materials are treated with a mild tanning agent such as aqueous formaldehyde or a salt such as sodium chloride, sodium sulfate, ammonium sulfate or any neutral inorganic ammonium or alkali metal salt, or an aluminum salt such as potassium aluminum sulfate or ammonium aluminum sulfate. The strips or tubes of collagen are immersed in a solution of the mild tanning agent and when a salt is used the strips may be immersed in a saturated salt solution or packed in wet condition in dry salt for at least twenty-four hours. The action of the mild tanning agent is to dehydrate and desensitize collagen to heat and resultant shrinkage by raising the shrinkage temperature. Whereas the shrinkage temperature of fresh collagen from mammalian intestines is 113° F. to 122° F. and significant shrinkage occurs at the latter temperature, material treated with a mild tanning agent may be heated to 122° F. without significant shrinkage occurring. After removal from the mild tanning agent such as the salt or salt solution and thorough washing to remove substantially all the salt or other tanning agent the strips or tubes of connective tissue layers are steeped in an aqueous solution containing 0.2 to 5 per cent by weight of a tri- or tetrasodium salt of ethylenediamine tetraacetic acid or a mixture of these two salts for a period of from 7 to 18 hours at a temperature of from about 96° F. to about 102° F. At a temperature below about 96° F., the cleaning action of the steeping solution is significantly reduced and at a temperature above about 102° F., the collagen strips or tubes are damaged and the strands produced have markedly decreased tensile strength. It is preferred that the steeping solution contain the sodium salt of ethylenediamine polyacetic acid in the amount of 0.3 to 2.0 per cent by weight. The temperature of the steeping bath should not be at any time above 122° F., since collagen at this temperature or higher, shrinks and undergoes denaturation. During the steeping operation the steeping bath may be agitated and this reduces the steeping time to as short a period as seven hours.

Connective tissue layers after one steeping step are substantially pure collagen and suturing and ligating strands having a high tensile strength and good bonding between plies may be made from such material; however, some improvement in tensile strength and bonding may be obtained by repeating the steeping step. It has been found advantageous to add a mild alkali to the second steeping solution, such as an amount of dilute ammonium hydroxide or dilute sodium carbonate solution, in an amount sufficient to maintain the pH of the steeping solution in the range of 8.0 to 11.5.

The removal of fats may be accelerated in the steeping step by the addition to the steeping solution of 5 to 10 per cent by weight of one or more organic solvents. Low molecular weight aliphatic alcohols and ether alcohols in general are satisfactory solvents. Examples of suitable alcohols include normal butanol, isobutanol, propanol, isopropanol, ethylene glycol monoethyl ether, and diethylene glycol monoethyl ether.

The addition to the steeping bath of one or more detergents in general alone or in conjunction with an organic solvent also facilitates and accelerates the removal of fat. Nonionic detergents such as alkylated aryl polyether alcohols, fatty acid alkylolamine condensates, alkylphenoxypolyethoxy alcohols, and polyethyleneglycol esters of fatty acids may be used in the steeping bath in an amount up to one per cent by weight of the steeping solution. Anionic and cationic detergents may be added to the steeping bath in amounts not greater than 0.5 per cent by weight of the steeping solution. Quaternary ammonium compounds are particularly suitable cationic detergents for they assist in the removal of noncollagenous proteins as well as fat from connective tissue layers.

The manner in which the sodium salts of ethylenediamine acetic acid act to remove noncollagenous materials, such as proteins, mucoids, and fats, from connective tissue layers, hides, and skins is not understood; however, it is likely that some noncollagenous proteins are solubilized and removed because they are solubilized at the alkalinity of the steeping bath. A steeping bath containing 1.0 per cent of the trisodium salt of ethylenediamine tetraacetic acid has a pH of about 8.4 and a steeping bath containing the tetrasodium salt of ethylenediamine tetraacetic acid has a pH of 10.4 to 11.5.

Noncollagenous proteins, and particularly those in the form of muscle fibers, which were originally part of the muscularis layer, adhere strongly to the connective tissue layer and are not readily removed by mechanical scraping and squeezing operations because some of the noncollagenous protein fibers are bonded to and imbedded in and entangled with connective tissue fibers. Fatty and lipid materials, either free or conjugated, also adhere tenaciously to connective tissue and muscle fibers, particularly along the blood vessels which permeate the connective tissue layers. Fatty and noncollagenous proteinaceous materials may be present in the form of complexes with metallic ions and it is thought that the sodium salts of ethylenediamine polyacetic acid increase the solubility of the complexes of protein and fats with metals by chelation with the metallic ions of the complexes. The unchelated complexes have very low or limited solubility in dilute alkaline solutions and are split only at a pH above 12. The increased solubility of the complexes which are chelated with a sodium salt of ethylenediamine polyacetic acid enables them to be more completely removed from connective tissue in the steeping bath and apparently their removal facilitates removal by the steeping bath of the unsolubilized particles of fat, muscle and mucosal proteins.

In order more clearly to disclose the nature of the present invention, several specific examples will hereinafter be described in considerable detail. It should be understood that these are presented solely for purposes of illustration and not with the object of either delineating the scope of the invention or restricting the breadth of the appended claims.

In the manufacture of collagenous suture and ligature strands from the connective tissue of sheep gut according to the process of this invention, fresh sheep gut is treated mechanically by scraping and squeezing operations to remove a major portion of the mucosal layer from the inside of the gut, the serous layer of connective tissue and the external fat associated therewith, a major amount of the muscularis layer between the serous and submucosal layers of connective tissue and the mesentery. This provides the submucosal layer of connective tissue contaminated with small but variable amounts of fat, muscle proteins from the muscularis and other noncollagenous proteins from the mucosal layers. This material may be processed further as it is in the form of tubes, or it may be split to provide two or more strips.

*Example 1*

One thousand 20-foot lengths of strips of the submucosal layer of connective tissue, obtained from fresh sheep gut by a mechanical scraping and squeezing operation, were immersed in a saturated aqueous sodium chloride solution for twenty-four hours, washed thoroughly and steeped for 18 hours in a first aqueous steeping bath containing 0.5 per cent by weight of the tetrasodium salt of ethylenediamine tetraacetic acid. The pH of the steeping bath was 10.3. The strips were removed from the first bath and placed in a second steeping bath containing 0.2 per cent by weight of the tetrasodium salt of ethylenediamine tetraacetic acid and allowed to steep for four hours, transferred to a third steeping bath containing 0.1 per cent by weight of the tetrasodium salt of ethylene diamine tetraacetic acid and allowed to steep for four hours, removed from the third bath and washed with water. The temperature of the steeping bath during the steeping periods was 38° C. The steeping baths were agitated for short times during the steeping periods. Three of the moist strips were twisted to form a strand, dried, and polished mechanically to suture size O, 17 mils' diameter. Four per cent of the strands were unsuitable for use as sutures and ligatures because of defects due to the presence of fatty and other noncollagenous substances. The dry knot tensile strength of these strands ranged from 7.2 to 10.2 pounds. The dry knot strength range for sutures of the same size, but prepared according to the conventional methods described above is 6.0 to 7.6 pounds. An average of twenty per cent of the strands prepared according to conventional methods are regularly found unsuitable for use as sutures and ligatures because of defects due to the presence of fatty and other noncollagenous substances.

Example II

One thousand 20-foot lengths of strips of the submucosal layer of connective tissue, obtained from fresh sheep gut by a mechanical scraping and squeezing operation were immersed in a saturated aqueous sodium chloride solution for twenty-four hours, washed thoroughly and steeped for 18 hours in a first aqueous steeping bath containing 0.5 per cent by weight of the tetrasodium salt of ethylenediamine tetraacetic acid. The pH of the bath was 10.3. The strips were removed from the first bath and placed in a second steeping bath containing 0.2 per cent by weight of the tetrasodium salt of ethylenediamine tetraacetic acid and five per cent by weight of normal butanol and allowed to steep for six hours, transferred to a third steeping bath containing 0.1 per cent by weight of the tetrasodium salt of ethylenediamine tetraacetic acid and allowed to steep for four hours, removed from the third bath, and washed with water. The temperature of the baths during the steeping periods was 40° C. The baths were agitated for short times during the steeping periods. Two of the moist strips were twisted to form a strand, dried, and polished mechanically to suture size O, 17 mils' diameter. The dry knot tensile strength of these strands ranged from 7.3 to 10.4 pounds. 3.6 per cent of the strands were unsuitable for use as sutures and ligatures because of defects due to the presence of fatty and other noncollagenous substances.

Example III

One hundred 20-foot lengths of strips of the submucosal layer of connective tissue, obtained from fresh sheep gut by mechanical scraping and squeezing operations were immersed in a saturated aqueous sodium chloride solution for twenty-four hours, washed thoroughly and steeped and agitated for eight hours at 30° C. in an aqueous bath containing one per cent of the tetrasodium salt of ethylenediamine tetraacetic acid, 0.5 per cent of a mixture of para-diisobutyl phenoxy polyethoxy ethanols having an average molecular weight of 635 and 0.1 per cent of para-diisobutyl phenoxy diethoxy ethylsulfate sodium salt. The pH of the bath was 10.4. The strips were removed from the bath and washed with water. Two moist strips were twisted to form a strand, dried, and polished mechanically to suture size O. Dry knot tensile strengths of these strands ranged from 7.3 to 10.4 pounds.

Example IV

One hundred 20-foot lengths of strips of the submucosal layer of connective tissue, obtained from fresh sheep gut by mechanically scraping and squeezing operations, were packed in dry ammonium sulfate for twenty-four hours, washed thoroughly and steeped for four hours in an aqueous bath containing 0.1 per cent of the tetrasodium salt of ethylenediamine tetraacetic acid, 0.05 per cent of methyl dodecyl benzyl trimethyl ammonium chloride, and 0.05 per cent by weight of a mixture of para-diisobutyl phenoxy polyethoxy ethanols having an average molecular weight of 635. The ribbons were squeezed and transferred to a steeping bath containing an aqueous solution of 0.4 per cent tetrasodium ethylenediamine tetraacetic acid and steeped for a period of 18 hours. The strips were washed. Three strips were spun together into a strand, dried, and polished to a diameter of 17 mils, U. S. P. size O suture. Tensile strength of these strands ranged from 6.8 to 10.2 pounds.

The serous layer of connective tissue of sheep gut is so thin and fragile that its utilization in the preparation of collagenous strands is impractical but the serous layer of beef intestines may be satisfactorily used. Beef intestines are mechanically treated by squeezing and washing operations to remove most of the mucosal layer and the resulting casings have the serous layer of connective tissue intact. Three-fourths to seven-eighths of the serous layer of connective tissue of a beef gut is longitudinally cut on each side of the mesentery and simultaneously stripped from the rest of the gut. The strips of serous layer of connective tissue are mechanically scraped to remove a major amount of the fat and the muscularis layer. These strips may be used in the preparation of collagenous strands suitable for suturing and ligating uses. The portion of the beef gut from which the serous layer of connective tissue has been removed may be treated by mechanical scraping operations to remove the mesentery and large quantities of fat associated therewith, the unremoved portion of the serous layer of connective tissue and a major amount of the fat, muscularis and mucosa. This provides a tube of submucosal connective tissue layer which may be split into two or more strips. These strips of submucosal connective tissue may also be used in the preparation of collagenous strands for suturing and ligating uses.

Example V

One hundred 20-foot lengths of strips of beef submucosal connective tissue obtained from fresh beef gut, were packed in dry ammonium sulfate for twenty-four hours, washed thoroughly and steeped in a first aqueous steeping bath containing one per cent of the tetrasodium salt of ethylenediamine tetraacetic acid for 16 hours. The strips were transferred to a second bath containing the same concentration of the tetrasodium salt of ethylenediamine tetraacetic acid plus ten per cent by weight of ethylene glycol monoethyl ether and allowed to steep for another 12 hours. The strips were passed through squeezing rollers to remove as much of the second steeping solution as possible, and washed in water. Three moist strips were twisted to form a strand, dried, and polished mechanically to suture size O, 17 mils' diameter. The dry knot tensile strength of these strands ranged from 6.5 to 9.7 pounds. The dry knot tensile strength of strands processed from the submucosal connective tissue of beef by the conventional cleaning and steeping method disclosed above as used in the preparation of sutures and ligatures from sheep gut, ranged from 5.0 to 7.2 pounds.

Example VI

One hundred 20-foot lengths of beef serosa strips, obtained from fresh beef gut were packed in dry ammonium sulfate for twenty-four hours, washed thoroughly and steeped for 16 hours in a first aqueous steeping bath containing 0.5 per cent by weight of the tetrasodium salt of ethylenediamine tetraacetic acid. The strips were removed from the first bath and transferred to a second bath containing the same amount of the tetrasodium salt of ethylenediamine tetraacetic acid as in the first bath plus 0.25 per cent by weight of a mixture of para-diisobutyl phenoxy polyethoxy ethanols having an average molecular weight of 635, and allowed to steep for eight hours. The strips were transferred to a third bath containing 0.1 per cent by weight of the tetrasodium salt of ethylenediamine tetraacetic acid to which has been added sufficient dilute ammonium hydroxide to bring the pH to 11 and allowed to steep for six hours, removed, and washed in water. The temperature of the steeping baths was 38° C. Three moist strips were twisted to form a strand, dried, and polished mechanically to suture size O, 17 mils' diameter. The dry knot tensile strength of these strands ranged from 7.4 to 10.6 pounds.

The removal of substantially all fats and noncollagenous proteins from hides and skins is readily accomplished by subjecting them, after the major amount of fat and noncollagenous proteins has been removed by mechanical scraping operations, to one or more periods of steeping, under the same conditions and in the same steeping bath as that described above in connection with the processing of strips of connective tissue from mammalian gut. Hides and skins treated in this manner have excellent tanning properties and may be made into leather of superior softness, flexibility, strength and other properties.

This application is a continuation-in-part of our application Serial No. 303,288 filed August 8, 1952.

What is claimed is:

1. A process for preparing collagen sutures and ligatures from the connective tissue of mammalian gut comprising the steps of: mechanically scraping and squeezing mammalian gut to remove a major amount of non-collagenous substance and provide connective tissue in association with a minor amount of fatty and non-collagenous proteinaceous materials, treating with a mild tanning agent, washing to remove the tanning agent, steeping in an aqueous solution containing 0.2 to 5.0 per cent by weight of a sodium salt of ethylenediamine polyacetic acid, whereby substantially all fatty and non-collagenous proteinaceous materials are removed, twisting the tissue to produce strands, and drying the strands.

2. A process for preparing collagen sutures and ligatures from the connective tissue of mammalian gut comprising the steps of: mechanically scraping and squeezing mammalian gut to remove a major amount of non-collagenous substance and provide connective tissue in association with a minor amount of fatty and non-collagenous proteinaceous materials, treating with salt, washing to remove salt, steeping in an aqueous solution containing 0.2 to 5.0 per cent by weight of at least one compound selected from the class consisting of tri and tetrasodium salts of ethylenediamine tetraacetic acid, whereby substantially all fatty and noncollagenous proteinaceous materials are removed, twisting the tissue to produce strands and drying the strands.

3. A process for preparing collagen sutures and ligatures from the connective tissue of mammalian gut comprising the steps of: mechanically scraping and squeezing mammalian gut to remove a major amount of non-collagenous substance and provide connective tissue in association with a minor amount of fatty and non-collagenous proteinaceous materials, treating with a neutral inorganic salt selected from the class consisting of alkali metal and ammonium salts for at least twenty-four hours, washing to remove salt, steeping in an aqueous solution containing 0.2 to 5.0 per cent by weight of at least one compound selected from the class consisting of tri and tetrasodium salts of ethylenediamine tetraacetic acid, for a period of 7 to 18 hours at a temperature of about 96° to 102° F., whereby substantially all fatty and noncollagenous proteinaceous materials are removed, twisting the tissue to produce strands, and drying the strands.

4. A process for preparing collagen sutures and ligatures from the connective tissue of mammalian gut comprising the steps of: mechanically scraping and squeezing mammalian gut to remove a major amount of non-collagenous substance and provide connective tissue in association with a minor amount of fatty and non-collagenous proteinaceous materials, treating with salt, washing to remove salt, steeping in an aqueous solution containing 0.2 to 5.0 per cent of the trisodium salt of ethylenediamine tetraacetic acid, whereby substantially all fatty and noncollagenous proteinaceous materials are removed, twisting the tissue to produce strands and drying the strands.

5. A process for preparing collagen sutures and ligatures from the connective tissue of mammalian gut comprising the steps of: mechanically scraping and squeezing mamalian gut to remove a major amount of non-collagenous substance and provide connective tissue in association with a minor amount of fatty and non-collagenous proteinaceous materials, treating with salt, washing to remove salt, steeping in an aqueous solution containing 0.2 to 5.0 per cent of the tetrasodium salt of ethylenediamine tetraacetic acid, whereby substantially all fatty and noncollagenous proteinaceous materials are removed, twisting the tissue to produce strands, and drying the strands.

6. A process for preparing collagen sutures and ligatures from the connective tissue of mammalian gut comprising the steps of: mechanically scraping and squeezing mammalian gut to remove a major amount of non-collagenous substance and provide connective tissue in association with a minor amount of fatty and non-collagenous proteinaceous materials, treating with salt, washing to remove salt, steeping the tissue in an agitated aqueous solution containing 0.2 to 5.0 per cent by weight of at least one compound selected from the class consisting of tri and tetrasodium salts of ethylenediamine tetraacetic acid, whereby substantially all fatty and non-collagenous proteinaceous materials are removed, twisting the tissue to produce strands, and drying the strands.

7. A process according to claim 2 in which the aqueous steeping solution contains 5 to 10 per cent by weight of a member selected from the class consisting of low molecular weight aliphatic alcohols and ether alcohols.

8. A process according to claim 2 in which the aqueous steeping solution contains at least one detergent selected from the class consisting of nonionic, anionic, and cationic detergents.

9. A process for preparing collagen sutures and ligatures from the connective tissue of mammalian gut comprising the steps of: mechanically scraping and squeezing mammalian gut to remove a major amount of non-collagenous substance and provide connective tissue in association with a minor amount of fatty and non-collagenous proteinaceous materials, treating with salt, washing to remove salt, steeping in an aqueous solution containing 0.3 to 2.0 per cent by weight of at least one compound selected from the class consisting of tri and tetrasodium salts of ethylenediamine tetraacetic acid, whereby substantially all fatty and noncollagenous proteinaceous materials are removed, twisting the tissue to produce strands, and drying the strands.

10. A process for preparing collagen sutures and ligatures from the connective tissue of mammalian gut comprising the steps of: mechanically scraping and squeezing mammalian gut to remove a major amount of non-collagenous substance and provide connective tissue in association with a minor amount of fatty and non-collagenous proteinaceous materials, treating with a neutral inorganic salt selected from the class consisting of alkali metal and ammonium salts for at least twenty-four hours, washing to remove salt, steeping in an aqueous solution containing 0.2 to 5.0 per cent by weight of at least one compound of the class of tri and tetrasodium salts of ethylenediamine tetraacetic acid, steeping in a second aqueous solution, containing 0.2 to 5.0 per cent by weight of at least one compound selected from the class consisting of tri and tetrasodium salts of ethylenediamine tetraacetic acid and an amount of a mild alkali such that the pH of the solution is 8.0 to 11.5, whereby substantially all fatty and noncollagenous proteinaceous materials are removed, twisting the tissue to produce strands, and drying the strands.

11. A process for preparing collagen sutures and ligatures from the connective tissue of mammalian gut comprising the steps of: mechanically scraping and squeezing mammalian gut to remove a major amount of non-collagenous substance and provide connective tissue in association with a minor amount of fatty and non-collagenous proteinaceous materials, treating with a dilute aqueous formaldehyde solution, washing to remove the formaldehyde, steeping in an aqueous solution containing 0.2 to 5.0 per cent by weight of a sodium salt of ethylenediamine polyacetic acid, whereby substantially all fatty and noncollagenous proteinaceous materials are removed, twisting the tissue to produce strands, and drying the strands.

References Cited in the file of this patent

UNITED STATES PATENTS

| | | |
|---|---|---|
| 653,829 | Trenckmann | July 17, 1900 |
| 1,758,564 | Ehrenreich | May 13, 1930 |
| 2,103,232 | Bohm | Oct. 28, 1937 |